United States Patent [19]

Chambers et al.

[11] Patent Number: 5,020,008
[45] Date of Patent: May 28, 1991

[54] METHOD OF CALIBRATING VEHICLE SPEED SIGNALS

[75] Inventors: John D. Chambers, Avon Lake; Duncan E. Estep, Elyria; Walter E. Frankiewicz, North Olmstead; Ronald W. Friend, Elyria; James M. Lawson, Wellington, all of Ohio

[73] Assignee: Allied-Signal Inc., Morristown, N.J.

[21] Appl. No.: 361,191

[22] Filed: Jun. 5, 1989

[51] Int. Cl.$^5$ .............................. G01B 22/00
[52] U.S. Cl. ............................ 364/561; 73/2; 377/30
[58] Field of Search ............ 73/1 R, 2; 364/561, 364/571.01, 571.02, 571.04; 377/30

[56] References Cited

U.S. PATENT DOCUMENTS

| | | | |
|---|---|---|---|
| 3,995,471 | 12/1976 | Konomi et al. | 73/1 R |
| 4,074,196 | 2/1978 | Webster | 324/166 |
| 4,217,484 | 8/1980 | Gerst | 377/30 X |
| 4,491,007 | 1/1985 | Crowdes, Jr. | 73/2 |

FOREIGN PATENT DOCUMENTS 657916 9/1986 Switzerland .

Primary Examiner—Parshotam S. Lall
Assistant Examiner—Edward R. Cosimano
Attorney, Agent, or Firm—Ken C. Decker; William N. Antonis

[57] ABSTRACT

A method of determining a calibration factor used to calibrate vehicle speed signals includes the steps of driving the vehicle over a measured distance, counting the pulses generated while driving the vehicle over the measured distance, and then calculating the calibration factor from the number of pulses counted and a nominal pulse count stored in memory. An indication of the difference in a reference speed using the old and new calibration factors is displayed to the vehicle operator who can then choose to accept or abort the new calibration factor.

10 Claims, 2 Drawing Sheets

METHOD OF CALIBRATING VEHICLE SPEED SIGNALS

BACKGROUND OF THE INVENTION

This invention relates to a method of calibrating vehicle speed signals.

It has become increasingly common for modern vehicles to be equipped with electronic speed sensors that generate an electromagnetic signal which varies in response to the speed of a corresponding wheel. These wheel speed signals are used, for example, in adaptive braking and/or adaptive traction systems to effect electronic control of the vehicle's brakes to prevent skidding and to transfer power from one wheel to the other if one wheel loses traction on the driving surface. Wheel speed signals may also be used to drive an electronic speedometer.

In general, wheel speed sensors consist of an electromagnetic pickup mounted adjacent a toothed tone wheel which is mounted for rotation with the corresponding vehicle wheel. The change in magnetic reluctance due to the constantly changing magnetic path depending upon whether a tooth or a space is moving across the electromagnetic pickup induces a pulsed output from the electromagnetic pickup. This output signal is transmitted through a calibration circuit which generates a square wave output signal from the input signal generated by the electromagnetic pickup. The frequency of this square wave signal is a function of instantaneous wheel speed. The automotive industry has adopted a standard for electronic speedometers and other devices in which such devices are designed to receive a nominal number of pulse counts per unit of distance traveled by the vehicle. The electronic speedometer is designed to indicate speed as a function of the frequency of this signal. However, the number of pulses generated by any typical speed sensing unit per unit of distance traveled can vary substantially, depending upon the size of the tire, diameter and number of teeth in the tone wheel, and tire inflation. Accordingly, a calibration factor must be used to convert the actual pulse counts per unit of distance traveled by the wheel into a signal that the electronic speedometer is designed to display that accurately reflects vehicle speed.

Determination of this calibration factor has proven to be in practice quite difficult. Of course, the correction factor can be calculated from known information, including the number of teeth on the tone wheel, rolling radius of the tire, etc., but this calculation is only approximate at best, and cannot take into account varying factors, such as tire inflation. Furthermore, a change in tire size will affect the calibration factor, and since changes in tire size are not recognized by the vehicle operator as affecting the speedometer calibration, it is doubtful that recalibration would be effected. Another way of establishing a calibration factor is to count the pulses as the vehicle is driven, calculate the calibration factor, and then set dip switches in the electronic hardware to set the new calibration factor. Obviously, this method also has disadvantages and is not likely to be performed on a regular basis.

BRIEF SUMMARY OF THE INVENTION

The present invention permits establishment of the calibration factor to be effected quickly and easily by the vehicle operator, does not require complicated calculations, and does not require special instruments or the setting of switches inside of the electronic hardware. The calibration procedure is made sufficiently simple that the vehicle operator can recalibrate the speedometer on a regular basis, thus insuring an accurate calibration if tire sizes are changed, or tire inflation is changed.

These and other advantages of the invention will become apparent from the following description, with reference to the accompanying drawings, in which;

FIG. 1 is a diagrammatic illustration of the vehicle wheel speed sensor, the conditioning circuit, the microcontroller, and associated switches used for performing the method according to the present invention; and FIG. 2 is a diagrammatic illustration of the sequence comprising the method pursuant to the present invention.

DETAILED DESCRIPTION

Figure 1:
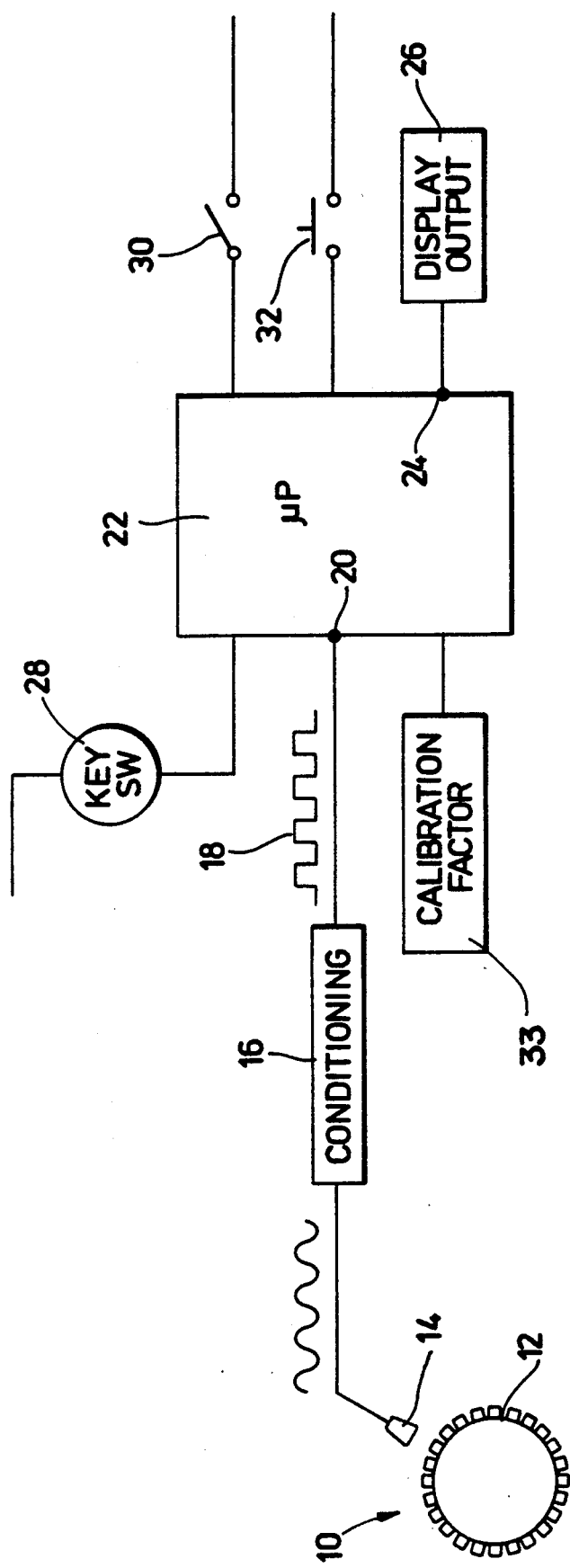

Referring now to FIG. 1, a wheel speed sensor generally indicated by the numeral 10 includes a toothed tone wheel 12, which is mounted for rotation proportional to the wheel rotation of a vehicle, and a conventional electromagnetic pickup 14. The magnetic pickup 14 responds to the change in reluctance of the magnetic path due to whether a tooth or a space between two adjacent teeth of the tone wheel 12 is brought into registry with the end of the magnetic pickup 14 to generate an output signal which varies in response to the speed of rotation of the tone wheel 12. This signal is fed through a conditioning circuit 16, which generates a square wave output indicated at 18, in which the pulse width will be a function of the speed of rotation of the tone wheel 12. The signal 18 is fed to a high speed input terminal 20 of a microprocessor 22. Microprocessor 22 generates a signal on output port 24 which drives an electronic display 26 in the operator's compartment of the vehicle to display vehicle speed. The microprocessor 22 creates the signal actuating the display 26 in response to the pulsed output signal 18 and a calibration factor as will be hereinafter described.

By industry standard, the display 26 is designed to respond to a nominal pulse count of 30,000 pulses per mile (18,641 pulses per kilometer). However, the number of pulses actually generated per mile by the wheel speed sensor 10 will be a function of the number of teeth on the tone wheel, tire size, tire inflation, etc. Accordingly, the microprocessor 22, in addition to measuring the signal frequency, also uses a calibration factor stored internally as indicated at 33 in order to calculate the signal transmitted to the display 26. The present invention relates to a method for determining this calibration factor. The microprocessor 22 includes terminals connected respectively to the vehicle ignition switch 28, a calibration switch 30, and a momentary contact pushbutton switch 32. When recalibration of the calibration constant is effected, the momentary contact switch 32 is momentarily closed after which the calibration switch 30 is closed and the vehicle is driven through a measured distance.

Figure 2:
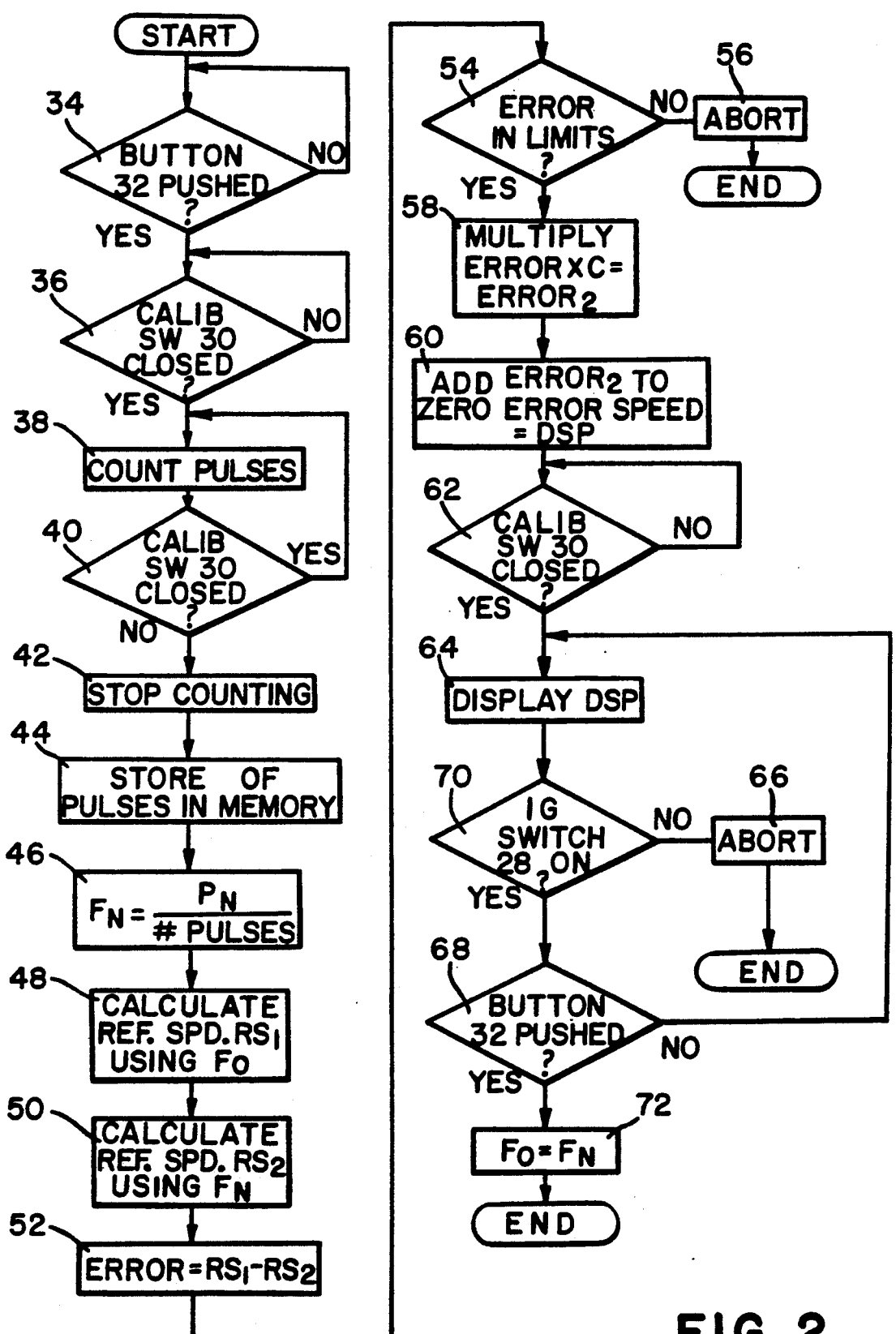

Referring now to FIG. 2, the manner in which the calculation of a new calibration factor is effected will be described in detail. When the vehicle operator effects a calibration, he depresses the momentary contact switch 32, as indicated at 34 in FIG. 2. If the button 32 has not been pushed, the program merely cycles back to the input to 34. If the button 32 has been pushed, the calibration switch 30 is checked as indicated at 36. If the calibration switch 30 has not been closed, the program cycles back to the input of 36. The calibration switch 30 will be closed by the vehicle operator at the beginning of the aforementioned measured distance. Therefore, if the switch 30 has been closed, the microprocessor 22 then begins counting pulses, as indicated at 38. The microprocessor 22 continues to count pulses, until the calibration switch 30 is turned off, as indicated at 40 in FIG. 2, which occurs at the end of the measured distance. If the calibration switch 30 has not been closed or turned off, the program continues to count pulses by branching back to the input of 38. When the calibration switch 30 is turned off or opened, counting is stopped, as indicated at 42, and the number of pulses is stored in memory as indicated at 44. The new calibration constant is calculated, as indicated at 46, as equal to the nominal number of pulse counts $P_n$ (30,000 pulses per mile), divided by the number of pulses stored in memory at 44. Accordingly, the microprocessor 22 will now retain in memory both the old calibration constant (hereinafter referred to as $F_o$) and the new calibration constant (hereinafter referred to as $F_n$).

Microprocessor 22 then calculates a reference speed $RS_1$ using the old calibration constant and a predetermined speed as indicated at 48. The predetermined speed is a speed stored in memory, for example, 55 miles per hour (88 kilometers per hour) to effect the calculations indicated at 48 and 50 in FIG. 2. As indicated at 50, the same predetermined speed which was used to calculate the reference speed $RS_1$ as indicated at block 48, is also used to calculate reference speed $RS_2$ in block 50. However, $RS_2$ is calculated using the new calibration constant $F_n$. As indicated at 52, the error is calculated as being equal to the difference between $RS_1$ and $RS_2$. This error which may be a positive or negative, is then tested as indicated at 54, to determine if it is within predetermined narrow limits. If the error is not within the limits, the calculation is aborted as indicated at 56. If the error is within the limits, the error, since it normallY would be quite small, is multiplied by a predetermined constant C at step 58 to form $Error_2$. If the error calculated at step 52 is, for example, a plus 1 mile per hour, and the predetermined constant C is 5, $Error_2$ at step 58 will be equal to a plus 5 miles per hour, so that a plus 1 mile per hour deviation in the reference speed between calculations using the old and new calibration constant will appear as a plus 5 miles per hour error in the calculation in block 60.

As indicated at 60, a display error speed DSP is calculated by adding $Error_2$ to a predetermined zero error speed. Zero error speed used at block 60 may be the same as or different than the reference speed used to calculate $RS_1$ and $RS_2$ For example, if the predetermined zero error speed to be used is 45 miles per hour (72 kilometers per hour), and $Error_2$ is a plus 5, the display error speed DSP will be 50 miles per hour (80 kilometers per hour). As indicated at 62, the vehicle operator is required to close the calibration switch 30 while vehicle speed is zero in order to display on display 26 the display error speed DSP, which may be greater thor less than the zero error speed (chosen arbitrarily here as 45 miles per hour). If the calibration switch 30 has not been closed, the program branches back to the input of 62. Since the vehicle operator knows the predetermined zero error speed (chosen here as 45 miles per hour), the magnitude of difference between the display error speed DSP and the zero error speed allows the vehicle operator to determine the acceptability of the calculation of the new calibration constant.

If the vehicle operator decides that the new calibration is not acceptable in view of the display error speed DSP displayed as indicated at 64, being significantly different than the known zero error speed. indicating a procedure error or major change in the vehicle, the operator may abort the calibration as indicated at 66 by turning the ignition switch 28 off, as indicated at 70. If the DSP is acceptable to the vehicle operator, the vehicle operator momentarilY closes the momentary switch 32 as indicated at 68. When this occurs the new calibration constant $F_n$ replaces the old calibration constant $F_o$, as indicated at 72. If the button 68 is not pushed, the program continues to display DSP, as indicated in FIG. 2 by branching back to the input of 64. Accordingly, future speedometer displays will be calculated using the new calibration constant.

We claim:

1. Method of establishing a distance calibration factor for use in calibrating a signal representing vehicle speed comprising the steps of providing a vehicle having a sensor which generates a pulsed output in response to vehicle motion and a microcontroller for calculating a vehicle speed from said pulsed output, said microcontroller including memory means for memorizing said calibration factor used by said microcontroller to calculate vehicle speed, driving the vehicle over a predetermined measured stance, causing said microcontroller to count the pulses generated while the vehicle is traveling over the measured distance and to memorize the number of pulses counted as a measured pulse count, causing said microcontroller to calculate a new calibration factor based upon the number of pulses counted, and storing the new calibration factor in memory inplace of the old calibration factor previously stored in memory, said new calibration factor being calculated as a function of a nominal pulse count and the number of pulses counted when the vehicle is driven over the measured distance.

2. Method of establishing a distance calibration factor as claimed in claim 1, wherein the new calibration of actor is calculated by dividing one of said pulse countes by the other.

3. Method of establishing a distance calibration factor as claimed in claim 1, wherein said method further includes the steps of indicating the magnitude of the error between the old and new calibration factors to the vehicle operator, and permitting the vehicle operator either select or abort the new calibration factor.

4. Method of establishing a distance calibration factor as claimed in claim 3, wherein said magnitude of the error is indicating by displaying an indication of said magnitude on a vehicle display.

5. Method of establishing a distance calibration factor as claimed in claim 1, wherein said vehicle is equipped with a calibration switch, said microcontroller being responsive to operation of the calibration switch to begin counting pulses from said sensor, and to stop counted pulses from said sensor when the calibrations which is operated again, said method further including the steps of operating said calibration switch at the beginning of said predetermined measured distance, and operating said calibration switch at the end of said predetermined distance.

6. Method of establishing a distance calibration factor as claimed in claim 5, further including the step of operating said vehicle at the a speed greater than a predetermined low speed before operating the calibrations witch at the beginning of the predetermined distance and continuing to operate the vehicle at a speed greater than a predetermined speed until after the calibration switch is operated at the end of the predetermined distance.

7. Method of establishing a distance calibration factor as claimed in claim 1, further including the step of calculating an old calibration speed using the old calibration factor, and using the new calibration factor to recalculate a new calibration speed using the same information which was used to calculate the old calibration speed except foe the calibration factor, and displaying on the vehicle display a display speed indicating the magnitude o the difference between the old and new calibration speeds.

8. Method of establishing a distance calibration factor as claimed in claim 1, further including the step of permitting the vehicle operator to establish or labor he new calibration factor depending upon the error indicated by the display speed.

9. Method of establishing a distance calibration factor as claimed in claim 7, wherein said vehicle is equipped with a calibration switch, said microcontroller being responsive to operation of the calibration switch to begin counting pulses from said sensor, to stop counting pulsed from said sensor when the calibration switch is operated again, and to display said display speed when the calibration switch is operated when the vehicle is stopped, said method further including the steps of operating said calibration switch at the beginning of said predetermined measured distance, operating said calibration switch at the end of said predetermined distances topping the vehicle, and operating said calibration switch to display said display speed.

10. Method of establishing a distance calibration factor as claimed in claim 9, further including the step of operating said vehicle at a speed greater than a predetermined low speed before operating the calibration switch at the beginning of the predetermined distance and continuing to operate the vehicle at a speed greater than a predetermined speed until after the calibration switch is operated at the end of the predetermined distance.

* * * * *